(12) United States Patent
JHA

(10) Patent No.: US 9,731,841 B2
(45) Date of Patent: Aug. 15, 2017

(54) EXTERIOR LIGHT UNIT FOR AN AIRCRAFT OR OTHER VEHICLE AND AIRCRAFT COMPRISING THE SAME

(71) Applicant: Goodrich Lighting Systems GmbH, Lippstadt (DE)

(72) Inventor: Anil Kumar JHA, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 135 days.

(21) Appl. No.: 14/667,118

(22) Filed: Mar. 24, 2015

(65) Prior Publication Data
US 2015/0274320 A1 Oct. 1, 2015

(30) Foreign Application Priority Data
Mar. 28, 2014 (EP) .................................... 14162218

(51) Int. Cl.
| | | |
|---|---|---|
| *F21V 1/20* | (2006.01) | |
| *B64D 47/06* | (2006.01) | |
| *F21V 5/04* | (2006.01) | |
| *F21V 13/06* | (2006.01) | |
| *F21W 101/00* | (2006.01) | |

(Continued)

(52) U.S. Cl.
CPC .............. *B64D 47/06* (2013.01); *F21V 5/046* (2013.01); *F21V 13/06* (2013.01); *B64D 2203/00* (2013.01); *F21W 2101/00* (2013.01); *F21W 2101/02* (2013.01); *F21W 2101/06* (2013.01); *F21Y 2103/33* (2016.08); *F21Y 2113/10* (2016.08); *F21Y 2115/10* (2016.08)

(58) Field of Classification Search
CPC ................................. F21V 5/046; B64D 47/06
See application file for complete search history.

(56) References Cited

U.S. PATENT DOCUMENTS

| | | | | |
|---|---|---|---|---|
| 5,897,201 A | * | 4/1999 | Simon | ........................ F21V 5/00 362/147 |
| 2010/0027281 A1 | * | 2/2010 | Waters | ................... B64D 47/06 362/470 |

(Continued)

FOREIGN PATENT DOCUMENTS

| | | |
|---|---|---|
| EP | 2138401 A1 | 12/2009 |
| EP | 2157017 A2 | 2/2010 |

(Continued)

OTHER PUBLICATIONS

European Search Report for Application No. 14162218.3-1757, Mailed on Oct. 1, 2014, 7 Pages.

*Primary Examiner* — Evan Dzierzynski
(74) *Attorney, Agent, or Firm* — Cantor Colburn LLP

(57) ABSTRACT

An exterior light unit, has an LED in operation emitting light; a reflector, which reflects a first portion of the light emitted by the LED; a first lens, through which the first portion of the light is refracted after being reflected by the reflector; and a second lens, which is an aspherical collimating lens and which is arranged in such a way with respect to the LED that a second portion of the light emitted by the LED has an unobstructed path to the second lens and is collimated by the second lens in a main light output plane. The second portion of the light, when on its way from the LED to the second lens, crosses way with the first portion of the light, when on its way from the reflector to the first lens.

14 Claims, 3 Drawing Sheets

(51) Int. Cl.
*F21W 101/02* (2006.01)
*F21W 101/06* (2006.01)
*F21Y 103/33* (2016.01)
*F21Y 113/10* (2016.01)
*F21Y 115/10* (2016.01)

(56) References Cited

U.S. PATENT DOCUMENTS

| | | | | |
|---|---|---|---|---|
| 2012/0287632 A1* | 11/2012 | Takahashi | ............ | F21V 23/006 |
| | | | | 362/235 |
| 2013/0107553 A1* | 5/2013 | Desai | ............ | B64D 47/06 |
| | | | | 362/470 |
| 2014/0016342 A1* | 1/2014 | Rice | ............ | F21S 48/1159 |
| | | | | 362/517 |
| 2015/0009700 A1* | 1/2015 | Yamamoto | ............ | F21S 48/1159 |
| | | | | 362/538 |
| 2015/0117044 A1* | 4/2015 | Durand | ............ | F21S 48/115 |
| | | | | 362/516 |

FOREIGN PATENT DOCUMENTS

| | | |
|---|---|---|
| WO | 2006091225 A1 | 8/2006 |
| WO | 2012083733 A1 | 6/2012 |
| WO | 2013111722 A1 | 8/2013 |

\* cited by examiner

EXTERIOR LIGHT UNIT FOR AN AIRCRAFT OR OTHER VEHICLE AND AIRCRAFT COMPRISING THE SAME

TECHNICAL FIELD

The present invention relates to exterior lighting systems for passenger transport vehicles. In particular, it relates to exterior light units that have a high intensity in one or more particular emission directions, such as beacon lights.

BACKGROUND

Almost all passenger transport vehicles have exterior lights. They are provided for a wide variety of different purposes, such as for allowing the passengers and/or operators to view the outside, for passive visibility, for signalling purposes, etc. In the aircraft industry and other fields, exterior lights are highly regulated in terms of the light intensity distributions that are emitted from the lights. For some exterior lights, it is desired and/or required by regulations to have high emission intensities in particular output regions or directions, such as particular output planes. In previous approaches, achieving said high emission intensities in particular output directions has resulted in large optical structures and light units.

In the exemplary field of aircraft, many exterior lights are arranged on the exterior of the aircraft fuselage or on the wings. These lights often add weight and power demand in undesired places. Further, many of these lights must be in locations where they can be seen from many angles, sometimes resulting in light positions that are disadvantageous in terms of the aerodynamics or other design goals of the aircraft.

Accordingly, it would be beneficial to reduce the size of exterior light units needed to achieve the respective design goals in terms of light intensity distributions. Further, it would be beneficial to provide an aircraft with such improved exterior lighting.

SUMMARY

Exemplary embodiments of the invention include an exterior light unit for an aircraft or other vehicle, such as a road vehicle, ship or rail car. The exterior light unit comprises an LED in operation emitting light; a reflector, which reflects a first portion of the light emitted by the LED; a first lens, through which the first portion of the light is refracted after being reflected by the reflector; and a second lens, which is an aspherical collimating lens and which is arranged in such a way with respect to the LED that a second portion of the light emitted by the LED has an unobstructed path to the second lens and is collimated by the second lens in a main light output plane. The second portion of the light, when on its way from the LED to the second lens, crosses way with the first portion of the light, when on its way from the reflector to the first lens.

The inventive exterior light unit allows for using a portion of the LED light for creating a peak light intensity in a desired output direction, namely within the main light output plane, while still allowing for another portion of the LED light to be used for satisfying other design goals/requirements of the light source. This dual purpose is achieved in a small space due to the particular arrangement of the reflector, the first lens and the second lens. The crossing of the light ways of the first portion of LED light and the second portion of LED light allows for a high integration of the optical elements, leading to overall low space constraints. The crossing of ways can also be stated as follows. The light rays of the first portion of LED light, when travelling from the reflector to the first lens, cross the light rays of the second portion of LED light, when travelling from the LED to the second lens. In this way, a strong peak intensity in the main light output plane, a high flexibility with respect to satisfying other design goals, and a high integration density, i.e. low space requirements, are achieved at the same time.

The first lens is not a collimating lens. While it may have one or more collimating lens portions, it is not collimating over its entire extension. In this way, a continuous output light intensity distribution may be achieved with the exterior light unit.

The LED may emit light in different colors, depending on the application scenario. It is pointed out that the term LED is intended to encompass a diode that emits infrared or ultraviolet light as well, although this light is not in the visible range.

The term aspherical collimating lens refers to a lens whose surface is not spherical, i.e. not a portion of a sphere, and that is suitable to collimate light emitted from a focal point thereof. The LED is placed in the focal point of the second lens in a cross-sectional plane orthogonal to the main light output plane.

The term to collimate light is used to denote the effect of bundling light. The target of this bundling is the main light output plane. However, a perfect collimation with all light leaving the lighting structure in the main light output plane is not realistic. This is due to the imperfection of the light source, i.e. due to the LED not being an ideal point light source, and due to the manufacturing tolerances of the aspherical collimating lens. The term to collimate light does not require a perfect collimation in a geometrical sense. Instead, it refers to an alignment of the output light that is possible under realistic use conditions.

The term main light output plane, which is the target of the collimation of the second lens, makes it clear that the collimation only takes place in one dimension, while diversion of the light in a second dimension is allowed. In other words, the second lens is not a collimating lens that collimates all light from the focal point in exactly one direction, i.e. along one line. Instead, the second lens combines collimation in one dimension with diversity in the output light intensity distribution in a second dimension. For example, the second portion of light may be collimated in the vertical direction, but may have a wide opening angle in the horizontal direction, when the light unit is attached to a vehicle, e.g. to an aircraft. In that case, the main light output plane is the horizontal plane.

According to a further embodiment, the reflector is an elliptical reflector, with the LED being positioned in a first focal point thereof. The term elliptical reflector refers to the elliptical shape of the reflector in a cross-sectional plane orthogonal to the main light output plane. Said term cross-sectional plane orthogonal to the main light output plane refers to the one plane or all the planes that is/are orthogonal to the main light output plane and that contain(s) the line having the shortest distance for connecting the LED (or one of the LED's, if more than one is provided) and the first and second lenses. The elliptical reflector allows for collecting the first portion of the light emitted in said cross-sectional plane and directing it to the second focal point of the elliptical reflector in said cross-sectional plane. This in turn allows for the first lens to be optimized with respect to this second focal point of the elliptical reflector. For the first lens, it appears that the first portion of the light all stems from the second focal point of the elliptical reflector. The elliptical reflector is an ideal way of virtually "moving" the LED to a different position for the first portion of the light. This again allows for a particularly compact design of the exterior light unit.

According to a further embodiment, the first lens comprises an aspherical collimating lens portion for collimating at least a part of the first portion of the light emitted by the LED in the main light output plane, which aspherical collimating lens portion is arranged in such a way that its focal point corresponds to a second focal point of the elliptical reflector. In this way, the collimating action into the main light output plane may be extended to part of the first portion of the light emitted by the LED. Accordingly, a high degree of collimation may be achieved in a small space by distributing the collimation action between the second lens on the one hand and the combination of the reflector and the first lens on the other hand.

According to a further embodiment, the LED is placed in such close proximity to the reflector that the light refracted by the aspherical collimating lens portion of the first lens has an opening angle of more than 5°, in particular of between 5° and 10° with respect to the main light output plane. By placing the LED in close proximity to the reflector, an extremely high spatial integration may be achieved. Due to the LED not being an ideal point light source, such close proximity between the LED and the reflector leads to a diffuse reflection by the reflector and an ensuing diffuse refraction by the aspherical collimating lens portion of the first lens. This diffuse image of the light source may be brought to good use by taking advantage of the resulting opening angle when output light intensity distributions are desired that aim for a non-perfect collimation, but for a finite opening angle of e.g. 5° or 10° with high light intensity. This may for example be desired in some aircraft beacon lights.

According to a further embodiment, the first lens comprises an aspherical collimating lens portion for collimating a first part of the first portion of the light emitted by the LED in the main light output plane and a free form lens portion for transforming a light intensity distribution of a second part of the first portion of the light emitted by the LED. In this way, a high level of collimation by the second lens and the aspherical collimating lens portion of the first lens is achieved, while at the same time providing a free form lens portion for achieving a desired transformation of the second part of the first portion of the light emitted by the LED. In this way, further design goals besides the collimation in the main light output plane may be conveniently achieved by the free form lens portion. The free form lens portion does not have a spherical form or a collimating form or another basic geometrical shape. Instead, it may have a specifically designed shape that enables a desired output light distribution of the exterior light unit outside of the main light output plane. It is known to the skilled person how to shape such a free form lens portion when the incoming light intensity distribution of the second part of the first portion of the LED light and the desired output light intensity distribution are known.

According to a further embodiment, the first lens and the second lens are formed in an integrated manner. In this way, the light from the LED may be put to optimal use, because no attachment portion between the two lenses can interfere with the paths of the light rays. Also, the integrated lens structure allows for an easier production process and assembly.

According to a further embodiment, the reflector collects the light emitted by the LED in an angular range with an opening angle of between 120° and 160°, in particular of between 130° and 150°, in a cross-sectional plane orthogonal to the main light output plane. Further in particular, the reflector may collect the light emitted by the LED in an angular range with an opening angle of about 140°. In this way, the reflector collects a large amount of light from the LED, leading to an overall very compact structure. A large first portion of the light from the LED crosses the second portion of light from the LED and is available for refraction at another portion of the exterior light unit where space is less of a concern.

According to a further embodiment, the second lens collects the light emitted by the LED in an angular range with an opening angle of between 20° and 60°, in particular of between 30° and 50°, in a cross-sectional plane orthogonal to the main light output plane. Further in particular, the second lens may collect the light emitted by the LED in an angular range with an opening angle of about 40°. In this way, a substantial portion of light is collimated by the second lens, while leaving a large amount of light at the disposal of the refraction action by the first lens. By providing the collection by the reflector and by the second lens with above discussed opening angles, nearly all or all light emitted by the LED may be used for the output light intensity distributions. An overall excellent light yield and efficiency is achieved.

According to a further embodiment, the LED is arranged in such a way that its principal light emission direction is orthogonal to the main light output plane. In this way, a particularly high integration density of the exterior light unit may be achieved.

According to a further embodiment, the exterior light unit comprises a plurality of LED's arranged adjacent to each other in a circumferential manner. In this way, the combined luminous flux of the plurality of LED's may be made use of. Overall light intensities and/or overall output light intensity distributions that cannot be achieved with one single LED may be implemented. The term circumferential refers to a closed contour, along which the plurality of LED's are arranged. Examples of such a closed contour are circular or elliptical contours. Accordingly, the plurality of LED's may be arranged along a circle or along an ellipse or along another closed contour.

According to a further embodiment, the reflector, the first lens and the second lens have annular structures and are arranged with respect to each other and with respect to the plurality of LED's in such a way that they form the same optical system in all cross-sectional planes orthogonal to the main light output plane. The term annular refers to a three-dimensional closed structure. In particular, it may refer to an extended circular or elliptical structure, i.e. a structure that extends around a two-dimensional contour, such as a circle or an ellipse. However, it may also refer to other suitable closed three-dimensional structures. In addition, the annular structures have the same cross-section at any point along the closed contour. In other words, the annular structures have the properties, as described in any of the embodiments above with respect to the reflector, the first lens and the second lens, along the closed contour. In yet other words, the annular structures give rise to a plurality of cross-sections in cross-sectional planes orthogonal to the main light output plane, in which the same arrangement between LED, reflector, first lens, and second lens is present. In particular, the distances and angles between the LED's and the reflector, the first lens, and the second lens may be the same in these cross-sectional planes orthogonal to the main light output plane. The annular structures track the arrangement of the plurality of LED's. In other words, if the plurality of LED's are arranged along a circle or along an ellipse, the annular structures of the reflector, the first lens and the second lens are three-dimensional structures, wherein a line along the respective structure is also a circle or an ellipse. Accordingly, a plurality of identical optical subsystems are provided around the plurality of LED's. In this way, a 360° light emission in the main light output plane may be achieved. Also, a rotational symmetry of the overall output light intensity distribution may be achieved.

According to an alternative embodiment, the exterior light unit may comprise at least one reflector, with each of the at least one reflector being identical in all cross-sectional planes orthogonal to the main light output plane, the at least one reflector being arranged adjacent to each other in a circumferential manner. The light unit may further comprise at least one first lens, with each of the at least one first lens being identical in all cross-sectional planes orthogonal to the main light output plane, the at least one first lens being arranged adjacent to each other in a circumferential manner. The light unit may further comprise at least one second lens, with each of the at least one second lens being identical in all cross-sectional planes orthogonal to the main light output plane, the at least one second lens being arranged adjacent to each other in a circumferential manner. The at least one reflector, the at least one first lens and the at least one second lens are arranged with respect to each other and with respect to the plurality of LED's in such a way that they form the same optical system in all cross-sectional planes orthogonal to the main light output plane. Stated differently, the feature of identical optical subsystems around the plurality of LED's may not only be achieved by the provision of the annular reflector, the annular first lens and the annular second lend. It is also possible that, instead of any one or any subset or all of these annular elements, a plurality of reflectors and/or a plurality of first lenses and/or a plurality of second lenses are provided that jointly form the respective annular structure. In other words, it is not necessary to provide single-piece annular structures for the reflector, the first lens and the second lens to achieve a desired 360° output light emission distribution.

According to a further embodiment, the plurality of LED's are of different colors. In this way, a multi-color exterior light unit may be achieved. It is also possible to combine the colors for achieving a particular shade of a desired color. It is also possible to provide LED's emitting infrared light, e.g. for night vision applications.

According to a further embodiment, the exterior light unit is an aircraft beacon light. The particular design requirements of an aircraft beacon light may be fulfilled in a very compact and power-efficient manner with the exterior light unit, as discussed in any of the embodiments above.

According to a further embodiment, the light output by the exterior aircraft light unit is in accordance with FAR requirements for beacon lights. In particular, the combination of the first and second lens may be adapted to transform the incoming light intensity distribution, as received from the LED and the reflector into an output light intensity distribution that satisfies FAR requirements for beacon lights. In particular, the output light intensity distribution may fulfil or exceed required minimum values and, if applicable, may be below required maximum values, as specified by the FAR. The light output by the exterior aircraft light unit may in particular satisfy the requirements of the light intensity distribution given in FAR 25.1401.

Exemplary embodiments of the invention further include an aircraft comprising at least one exterior light unit, as described in accordance with any of the embodiments above. In a particular embodiment, the aircraft may comprise an exterior light unit, as described in accordance with any of the embodiments above, disposed on the top of the aircraft as a beacon light. In addition/in the alternative, the aircraft may comprise an exterior light unit, as described in accordance with any of the embodiments above, disposed on the bottom of the aircraft as a beacon light. The modifications and advantages discussed above with respect to the exterior light unit equally apply to the aircraft.

Exemplary embodiments of the invention further include a method of replacing a used beacon light unit of an aircraft with an exterior light unit, as described in accordance with any of the embodiments above, the method comprising the steps of disconnecting the used beacon light unit from a power supply and connecting the exterior light unit, as described in accordance with any of the embodiments above, to the power supply. In this way, the advantages of the invention can be extended to existing aircraft. In particular, existing beacon lights may be replaced without changing the power supply network of the aircraft. The modifications and advantages discussed above with respect to the exterior light unit equally apply to the aircraft.

BRIEF DESCRIPTION OF THE DRAWINGS

Embodiments of the invention are described in greater detail below with reference to the figures, wherein.

DETAILED DESCRIPTION

Figure 1:
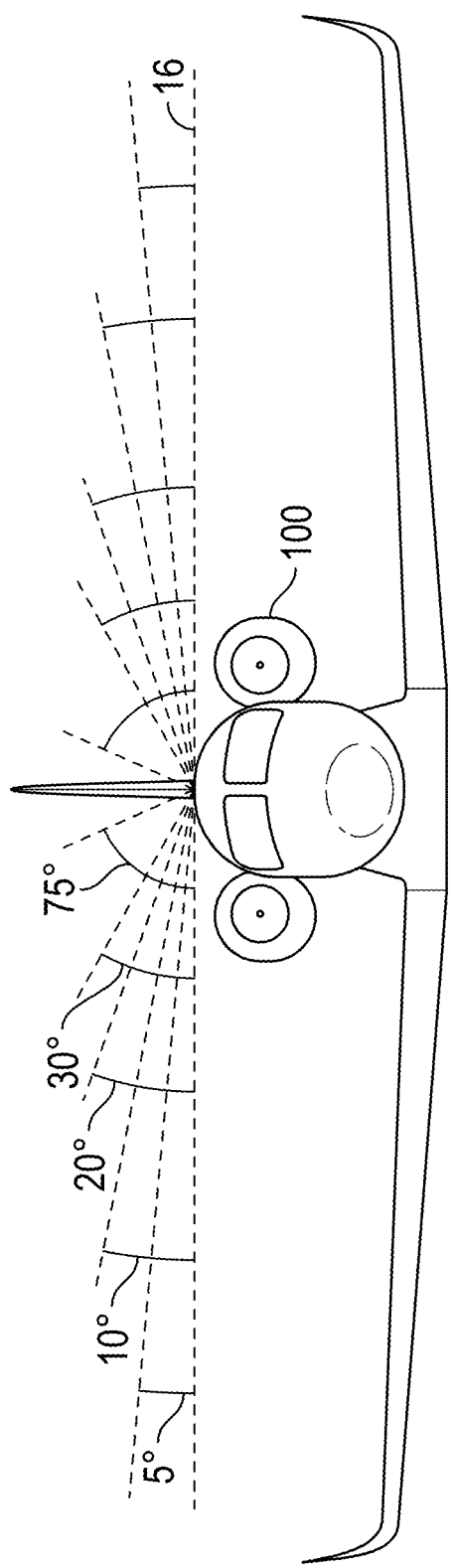
FIG. 1 shows an exemplary light intensity distribution, as required by the Federal Aviation Regulations.

FIG. 1 shows an exemplary embodiment of a light intensity distribution of a beacon light, mounted to the top of a schematically represented aircraft 100. The light intensity distribution is in accordance with the Federal Aviation Regulations (FAR) requirements for a beacon light, mounted to the top of the aircraft 100. In particular, the light intensity distribution fulfils FAR 25.1401 requirements. The light intensity distribution is shown as an angular distribution with respect to the horizontal plane 16. In particular, it is shown in a vertical cross-sectional plane that is orthogonal to the longitudinal extension of the aircraft fuselage. However, as the FAR requirements are described as a rotational distribution, i.e. as a distribution that is identical in all viewing directions from the beacon light, the shown light intensity distribution would look the same in all vertical cross-sections through the center of the beacon light.

The light intensity distribution is as follows. A light intensity of 400 cd is required for an angular range of between 0° and 5° with respect to the horizontal plane 16. A light intensity of 240 cd is required in an angular range of between 5° and 10° with respect to the horizontal plane 16. A light intensity of 80 cd is required in an angular range between 10° and 20° with respect to the horizontal plane 16. A light intensity of 40 cd is required in an angular range of between 20° and 30° with respect to the horizontal plane 16. A light intensity of 20 cd is required in an angular range of between 30° and 75° with respect to the horizontal plane 16.

Accordingly, the required light intensity values, shown as angular sectors in FIG. 1, represent minimum light intensity values, required by the FAR. As the horizontal plane 16 is the plane with the highest required light intensity, it is also referred to as main light output plane 16.

Figure 2:
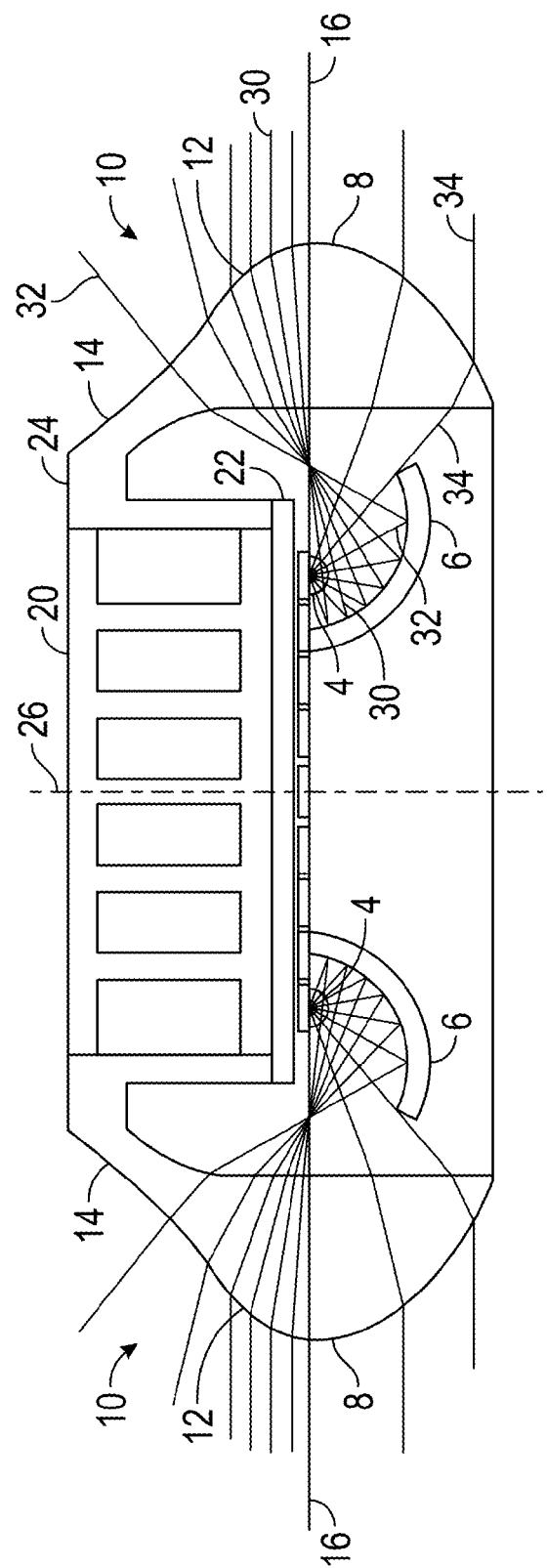
FIG. 2 shows a cross-sectional view of an exemplary embodiment of an exterior light unit in accordance with the invention.

FIG. 2 shows a cross-sectional view of an exterior light unit in accordance with an exemplary embodiment of the invention. This exemplary exterior light unit 2 could be mounted to the top of the schematic aircraft 100 of FIG. 1 and would satisfy the shown required light intensity distribution. Accordingly, the exterior light unit 2 may be used as a beacon light in the field of aircraft. The exterior light unit 2 may equally be used as a beacon light mounted to the bottom of an aircraft. For this purpose, the exterior light unit 2 must be merely flipped upside down.

The exterior light unit 2 of FIG. 2 has a mounting plate 22, to which most elements of the exterior light unit 2 are mounted. In the exemplary embodiment of FIG. 2, the mounting plate 22 is circular, which may also be seen from FIG. 3. On one side of the mounting plate 22, which is the bottom side of the mounting plate 22 in the depicted orientation of the exterior light unit 2, a plurality of LED's 4 is provided. Said plurality of LED's 4 are arranged in a circular configuration, with the LED's being arranged adjacent to each other. In the cross-sectional view of FIG. 2, two LED's 4 are shown.

An angular elliptical reflector 6 is also mounted to the same side of the mounting plate 22 as the LED's 4. The elliptical reflector 6 is an annular structure, whose inner side is attached to the mounting plate 22 towards the inside of the LED's 4 and which extends towards the outside underneath the plurality of LED's 4. The terms inside and outside relate to an axis of rotation 26. The elliptic reflector 6 is rotationally symmetric around the axis of rotation 26. The elliptical reflector 6 is referred to as elliptical, because it has an elliptical shape in the cross-sectional plane of FIG. 2 as well as all other vertical cross-sectional planes including the axis of rotation 26.

A lens structure is mounted to the mounting plate 22 on the other side thereof. This lens structure is a single-piece integrated structure that comprises a mounting arm 24, a first lens 10, and a second lens 8. The first lens 10 in turn comprises an aspherical collimating lens portion 12 and a free form lens portion 14. The mounting arm 24 transitions into the free form lens portion 14, which in turn transitions into the aspherical collimating lens portion 12, which in turn transitions into the second lens 8. In the drawing plane of FIG. 2, the mounting arm 24 extends towards the top from the mounting plate 22, before turning towards the outside, as seen from the axis of rotation 26. The free form lens portion 14, the aspherical collimating lens portion 12, and the second lens 8 then extend from the mounting arm 24 towards the bottom in the drawing plane of FIG. 2. The lens structure, consisting of the mounting arm 24, the first lens 10, and the second lens 8, is also rotationally symmetric with respect to the axis of rotation 26.

The plane separating the first lens 10 from the second lens 8 coincides with the plane through the surface of the mounting plate 22 to which the plurality of LED's 4 are attached. In other words, the bottom surface of the mounting plane 22, when extended horizontally, represents the boundary between the first lens 10 and the second lens 8. In the cross-sectional view of FIG. 2, the inner surface of the second lens 8 and of the aspherical collimating lens portion 12 of the first lens 10 are a straight vertical line. In three dimensions, the inner surface of the second lens 8 and of the aspherical collimating lens portion 12 of the first lens 10 form a cylindrical surface around the axis of rotation 26. The free form lens 14 has both an inner surface and an outer surface that are not basic geometrical shapes.

The exterior light unit 2 further comprises a heat sink structure 20, attached to the same side of the mounting plate 22 that the lens structure is attached to. The heat sink structure 20 extends in the space between the mounting arm 24, which has the form of a hollow cylinder. The heat sink structure 20 is provided for absorbing the heat generated by the plurality of LED's 4 and for transporting said heat away from the mounting plate 22. For this purpose, the heat sink structure 20 has cooling ribs that define cooling channels therebetween.

It is pointed out that the LED's 4 are respectively positioned in a focal point of the elliptical reflector 6 and of the second lens 8. The elliptical reflector 6 has a second focal point 18 in every cross-sectional plane that is orthogonal to the main light output plane, such as the drawing plane of FIG. 2. This focal point 18 is also the focal point of the aspherical collimating lens portion 12 of the first lens 10.

The operation of the exterior light unit 2 is described with respect to the right hand side of the exterior light unit 2 of FIG. 2, as depicted in the drawing plane of FIG. 2. As the optical elements of the reflector 6, the first lens 10 and the second lens 8 are rotationally symmetric, the optical properties equally apply to the left hand side of the exterior light unit 2 of FIG. 2 as well as to all other cross-sections of the exterior light unit 2.

The operation of the exterior light unit 2 is described with respect to three exemplary light rays 30, 32 and 34. The first light ray 30 is an exemplary light ray of the first portion of the light emitted from the LED 4. It is emitted towards the left bottom in the drawing plane of FIG. 2. Belonging to the first portion of light emitted from the LED 4, it is reflected by the elliptical reflector 6. In particular, the first light ray 30 extends from the LED 4 towards the reflector 6, from where it is reflected towards the aspherical collimating lens portion 12 of the first lens 10. On its path from the reflector 6 to the aspherical collimating lens portion 12, the first light ray 30 travels through the second focal point 18 of the elliptical reflector 6. The first light ray 30 is refracted by the aspherical collimating lens portion 12 in such a way that it leaves the exterior light unit 2 in a horizontal direction. Being in a horizontal direction, the first light ray 30 contributes to the emission in the main light output plane, which corresponds to the depicted horizontal plane 16.

It is emphasized that the slight offset between the first light ray 30 and the depicted horizontal plane 16 is negligible when looking at the exterior light unit 2 from a reasonable distance, i.e. from a distance that is representative of the intended signalling distance of an aircraft beacon light. Accordingly, all light rays leaving the exterior light unit 2 in the horizontal plane 16 or parallel to the horizontal plane 16 equally contribute to the emission in the main light output plane. They have no angle with respect to the main light output plane.

The second light ray 32 also belongs to the first portion of the light emitted from the LED 6. As such, it is reflected by the reflector 6 and directed towards the second focal point 18. However, as the second light ray 32 is emitted from the LED 4 towards the right bottom in the drawing plane of FIG. 2, it is reflected by the elliptical reflector 6 towards the free form lens portion 14 of the first lens 10. In the free form lens portion 14, the second light ray is refracted at both the inner surface and the outer surface thereof. In this way, its travelling direction is altered by the free form lens portion 14 as compared to its travelling path on the inside of the first lens 10.

The third light ray 34 is emitted from the LED 4 towards the second lens 8 where it is refracted into the main light output plane. On its way to the second lens 8, the third light ray 34 crosses the first light ray 30 and the second light ray 32.

When looking at the totality of all light rays emitted from the LED 4, the following observations can be made. The aspherical collimating lens portion 12 of the first lens 10 and the second lens 8 bundle a first part of the first portion of light as well as a second portion of light. However, due to the extension of the LED 4 and its non-ideal characteristics associated therewith as well as due to manufacturing tolerances of the collimating lenses, this light is not perfectly collimated, but emitted from the exterior light unit 2 with an opening angle of approx. 10°. A particular peak of the light intensity is between 0° and 5° with respect to the horizontal plane 16. However, a high light intensity is also achieved in the angular range of between 5° and 10° with respect to the horizontal plane 16. In this way, the light intensity requirements of the FAR, as depicted in FIG. 1, are satisfied with respect to the angular range of between 0° and 10° with respect to the horizontal plane 16.

Further, the free form lens portion 14 transforms the light collected by its inner surface into an output light intensity distribution, which satisfies the FAR requirements for the angular range between 10° and 75° with respect to the horizontal plane 16, as depicted in FIG. 1. Knowing the incoming light intensity distribution on the inner surface of the free form lens portion 14 and knowing the required light intensity distribution on the outside thereof, which may also be an envelope curve around the required values of FIG. 1, a skilled person knows how to shape the inner and outer surfaces of the free form lens portion 14 in order to achieve said transformation.

Figure 3:
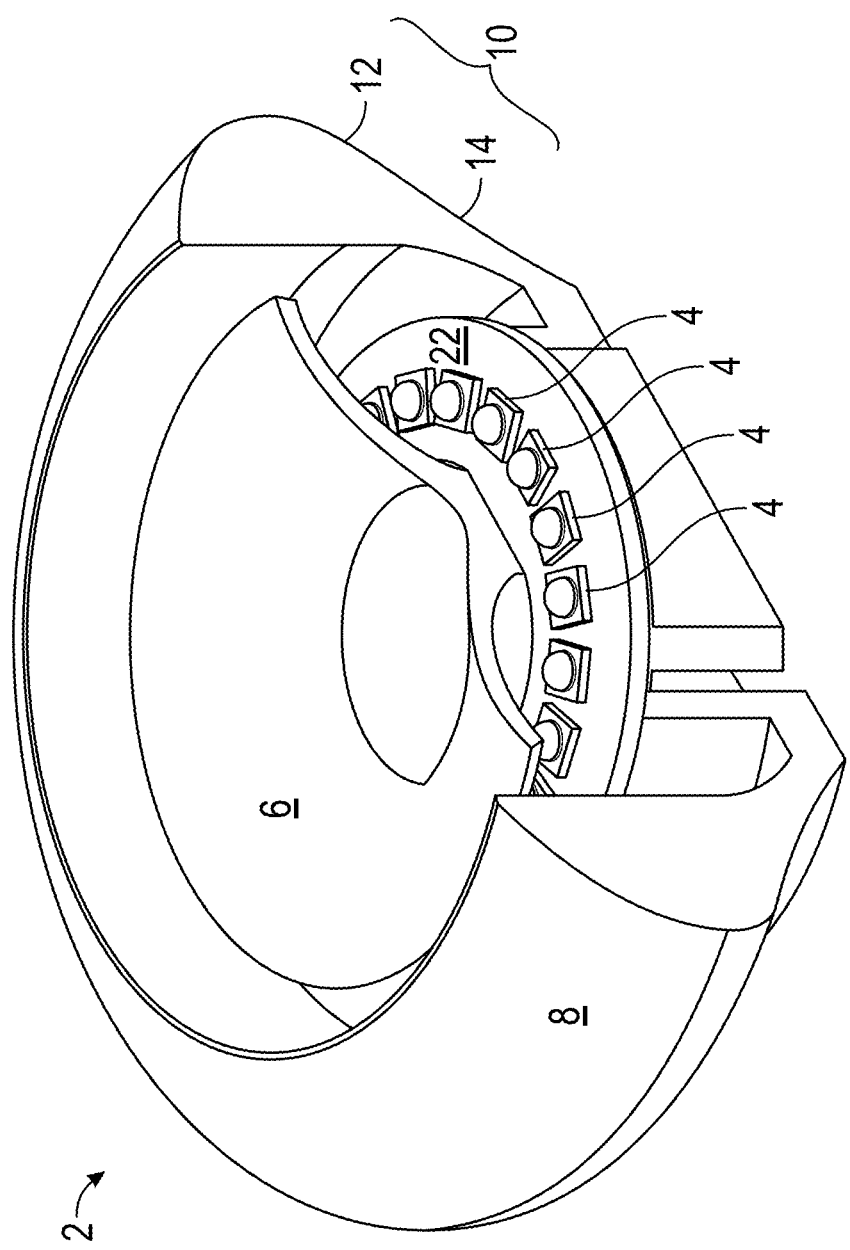
FIG. 3 shows a partially cut-out, perspective view of the exterior light unit of FIG. 2.

FIG. 3 shows a partially cut-out, perspective view of the exterior light unit 2 of FIG. 2, when flipped upside down and viewed slightly from the top. As can be seen from FIG. 3, the lens structure is rotationally symmetric. Also, the elliptical reflector 6 is rotationally symmetric. The plurality of LED's 4 are arranged one besides the other in a circular arrangement.

In the particular embodiment of FIG. 3, red and white LED's are arranged in an alternating order. In this way, the exterior light unit 2 may be operated in a red mode, a white mode, or a combined mode emitting desired color shades. It is also possible that yellow LED's are used instead of white LED's, such that orange light may be produced. Overall, by providing suitable colored LED's, a desired color or desired shade of a color may be achieved. It is also possible to provide infrared LED's for particular applications, such as night vision applications.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Exterior light unit for a vehicle, the exterior light unit comprising:
   an LED in operation emitting light;
   a reflector, which reflects a first portion of the light emitted by the LED;
   a first lens, through which the first portion of the light is refracted after being reflected by the reflector; and
   a second lens, which is an aspherical collimating lens and which is arranged in such a way with respect to the LED that a second portion of the light emitted by the LED has an unobstructed path to the second lens and is collimated by the second lens in a main light output plane,
   wherein the second portion of the light, when on its way from the LED to the second lens, crosses way with the first portion of the light, when on its way from the reflector to the first lens,
   wherein the reflector is an elliptical reflector, with the LED being positioned in a first focal point thereof, and
   wherein the first lens comprises an aspherical collimating lens portion for collimating at least a part of the first portion of the light emitted by the LED in the main light output plane, which aspherical collimating lens portion is arranged in such a way that its focal point corresponds to a second focal point of the elliptical reflector.

2. Exterior light unit according to claim 1, wherein the LED is placed in such close proximity to the reflector that the light refracted by the aspherical collimating lens portion of the first lens has an opening angle of more than 5°, in particular of between 5° and 10° with respect to the main light output plane.

3. Exterior light unit according to claim 1, wherein the first lens comprises an aspherical collimating lens portion for collimating a first part of the first portion of the light emitted by the LED in the main light output plane and a free form lens portion for transforming a light intensity distribution of a second part of the first portion of the light emitted by the LED.

4. Exterior light unit according to claim 1, wherein the first lens and the second lens are integrally formed.

5. Exterior light unit according to claim 1, wherein the reflector collects the light emitted by the LED in an angular range with an opening angle of between 120° and 160°, in particular of between 130° and 150°, in a cross-sectional plane orthogonal to the main light output plane.

6. Exterior light unit according to claim 1, wherein the second lens collects the light emitted by the LED in an angular range with an opening angle of between 20° and 60°, in particular of between 30° and 50°, in a cross-sectional plane orthogonal to the main light output plane.

7. Exterior light unit according to claim 1, wherein the LED has a principal light emission direction and wherein the LED is arranged such that the principal light emission direction is orthogonal to the main light output plane.

8. Exterior light unit according to claim 1, comprising a plurality of LED's arranged adjacent to each other in a circumferential manner.

9. Exterior light unit according to claim 8, wherein the reflector, the first lens and the second lens have annular structures and are arranged with respect to each other and with respect to the plurality of LED's in such a way that they form the same optical system in all cross-sectional planes orthogonal to the main light output plane.

10. Exterior light unit according to claim 8, wherein the plurality of LED's are of different colors.

11. Exterior light unit according to claim 1, wherein the vehicle is an aircraft, and wherein light output by the exterior light unit is in accordance with FAR requirements for beacon lights.

12. An aircraft comprising at least one exterior light unit in accordance with claim 1.

13. An aircraft according to claim 12, wherein the exterior light unit is disposed on the top or the bottom of the aircraft as a beacon light.

14. Method of replacing a used beacon light unit of an aircraft with an exterior light unit in accordance claim 1, the method comprising the steps of:
- disconnecting the used beacon light unit from a power supply, and
- connecting the exterior light unit according to claim 1 to the power supply.

* * * * *